United States Patent
Kagan et al.

(10) Patent No.: US 9,871,734 B2
(45) Date of Patent: Jan. 16, 2018

(54) PRIORITIZED HANDLING OF INCOMING PACKETS BY A NETWORK INTERFACE CONTROLLER

(75) Inventors: Michael Kagan, Zichron Yaakov (IL); Noam Bloch, Bat Shlomo (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 398 days.

(21) Appl. No.: 13/481,890

(22) Filed: May 28, 2012

(65) Prior Publication Data
US 2013/0315237 A1 Nov. 28, 2013

(51) Int. Cl.
H04L 12/28 (2006.01)
H04L 12/851 (2013.01)
H04L 29/00 (2006.01)
G06F 13/30 (2006.01)

(52) U.S. Cl.
CPC .......... H04L 47/2441 (2013.01); G06F 13/30 (2013.01); H04L 29/00 (2013.01); H04L 47/2408 (2013.01)

(58) Field of Classification Search
CPC .......... G06F 13/24; G06F 13/26; G06F 13/28; G06F 13/32; G06F 3/00; G06F 13/14; G06F 13/30; G06F 13/4022; H04L 49/90; H04L 49/9063; H04L 69/22; H04L 169/161; H04L 47/50; H04L 47/6215; H04L 47/10; H04L 47/283; H04L 12/56; H04L 47/2441; H04L 47/00; H04L 47/2408; H04L 49/00; H04L 29/06; H04L 29/00
USPC ................ 370/307, 392, 412-418, 231, 389; 709/203, 223, 224, 227; 719/314
See application file for complete search history.

(56) References Cited

U.S. PATENT DOCUMENTS

| | | | |
|---|---|---|---|
| 6,148,082 A | 11/2000 | Slattery et al. | |
| 6,335,930 B1 | 1/2002 | Lee | |
| 6,480,500 B1 | 11/2002 | Erimli et al. | |
| 6,532,211 B1 | 3/2003 | Rathonyi et al. | |
| 6,775,268 B1 | 8/2004 | Wang et al. | |
| 6,804,532 B1 | 10/2004 | Moon et al. | |
| 6,912,604 B1 | 6/2005 | Tzeng et al. | |
| 7,076,569 B1 | 7/2006 | Bailey et al. | |

(Continued)

OTHER PUBLICATIONS

Leiserson, C E., "Fat-Trees: Universal Networks for Hardware Efficient Supercomputing", IEEE Transactions on Computers, vol. C-34, No. 10, pp. 892-901, Oct. 1985.

(Continued)

*Primary Examiner* — Harun Chowdhury
(74) *Attorney, Agent, or Firm* — D. Kligler IP Services Ltd.

(57) ABSTRACT

A network interface controller includes a host interface, which is configured to be coupled to a host processor having a host memory. A network interface is configured to receive data packets from a network, each data packet including a header, which includes header fields, and a payload including data. Packet processing circuitry is configured to process one or more of the header fields and at least a part of the data and to select, responsively at least to the one or more of the header fields, a location in the host memory. The circuitry writes the data to the selected location and upon determining that the processed data satisfies a predefined criterion, asserts an interrupt on the host processor so as to cause the host processor to read the data from the selected location in the host memory.

41 Claims, 3 Drawing Sheets

(56) References Cited

U.S. PATENT DOCUMENTS

| | | | |
|---|---|---|---|
| 7,159,111 B1* | 1/2007 | Ganapathy | 713/167 |
| 7,286,535 B2 | 10/2007 | Ishikawa et al. | |
| 7,675,876 B2* | 3/2010 | Foster et al. | 370/307 |
| 7,676,597 B2 | 3/2010 | Kagan et al. | |
| 7,746,854 B2 | 6/2010 | Ambe et al. | |
| 7,937,499 B1* | 5/2011 | Tripathi | 709/250 |
| 8,341,724 B1* | 12/2012 | Burns et al. | 726/13 |
| 2002/0165897 A1 | 11/2002 | Kagan et al. | |
| 2002/0194342 A1* | 12/2002 | Lu | H04L 29/06 709/227 |
| 2003/0043805 A1* | 3/2003 | Graham et al. | 370/392 |
| 2003/0065812 A1 | 4/2003 | Beier et al. | |
| 2003/0065856 A1 | 4/2003 | Kagan et al. | |
| 2003/0223453 A1 | 12/2003 | Stoler et al. | |
| 2004/0267881 A1* | 12/2004 | Yao et al. | 709/203 |
| 2005/0071473 A1 | 3/2005 | Rosenstock et al. | |
| 2006/0047867 A1* | 3/2006 | Craddock | G06F 5/065 710/54 |
| 2006/0280181 A1* | 12/2006 | Brailas et al. | 370/392 |
| 2007/0005742 A1* | 1/2007 | Eldar et al. | 709/223 |
| 2007/0058536 A1 | 3/2007 | Vaananen et al. | |
| 2007/0211741 A1* | 9/2007 | Kagan et al. | 370/412 |
| 2008/0013549 A1 | 1/2008 | Okagawa et al. | |
| 2008/0080505 A1 | 4/2008 | Munoz | |
| 2008/0112415 A1* | 5/2008 | Sobaje | 370/392 |
| 2008/0189432 A1 | 8/2008 | Abali et al. | |
| 2009/0077567 A1* | 3/2009 | Craddock et al. | 719/314 |
| 2009/0119565 A1 | 5/2009 | Park et al. | |
| 2009/0238181 A1 | 9/2009 | Desai et al. | |
| 2010/0039959 A1 | 2/2010 | Gilmartin | |
| 2010/0220732 A1 | 9/2010 | Hussain et al. | |
| 2010/0284404 A1 | 11/2010 | Gopinath et al. | |
| 2010/0315958 A1 | 12/2010 | Luo et al. | |
| 2011/0064084 A1 | 3/2011 | Tatar et al. | |
| 2011/0096668 A1 | 4/2011 | Bloch et al. | |
| 2011/0134753 A1* | 6/2011 | Kashyap | 370/231 |
| 2012/0300669 A1 | 11/2012 | Zahavi | |
| 2012/0314706 A1 | 12/2012 | Liss | |
| 2013/0114599 A1 | 5/2013 | Arad | |
| 2013/0151744 A1* | 6/2013 | Gupta et al. | 710/263 |

OTHER PUBLICATIONS

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—The International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

InfiniBand Trade Association, "InfiniBandTM Architecture Specification Volume 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

U.S. Appl. No. 13/154,458, filed Jun. 7, 2011.

U.S. Appl. No. 13/114,071, filed May 24, 2011.

U.S. Appl. No. 13/291,143, filed Nov. 8, 2011.

U.S. Appl. No. 12/910,900 Office Action dated Apr. 9, 2013.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Martinez et al., "Supporting fully adaptive routing in Infiniband networks", Proceedings of the International Parallel and Distributed Processing Symposium (IPDPS'03), Nice, France, 10 pages, Apr. 22-26, 2003.

Haramaty et al. U.S. Appl. No. 13/754,921, filed Jan. 31, 2013.

U.S. Appl. No. 13/291,143 Office Action dated Jun. 27, 2014.

* cited by examiner

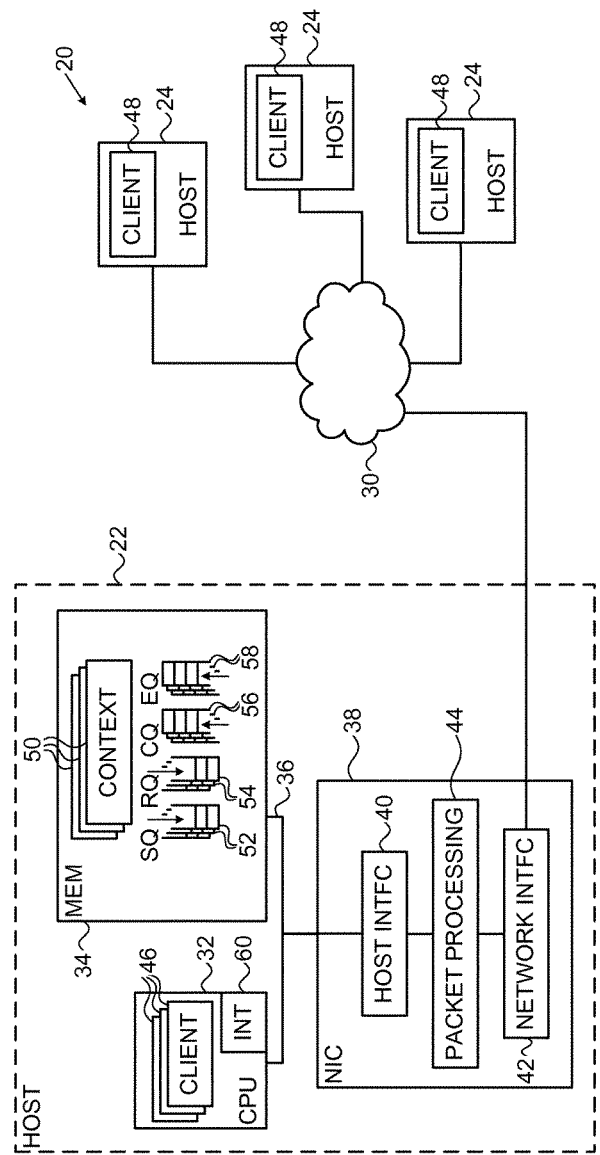

PRIORITIZED HANDLING OF INCOMING PACKETS BY A NETWORK INTERFACE CONTROLLER

FIELD OF THE INVENTION

The present invention relates generally to digital network communications, and specifically to devices for interfacing between a computing device and a packet data network.

BACKGROUND

Switched-fabric communications architectures are widely used in high-performance computing. Examples of such architectures include InfiniBand and high-speed Ethernet. The InfiniBand (IB) architecture will be described here by way of illustration (and aspects of the implementation of the present invention in the IB environment will be described below in the Detailed Description), but it should in no way be understood that the present invention is limited to one particular type of switched fabric or another.

The IB architecture has been standardized by the InfiniBand Trade Association. Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA).

Client processes (referred to hereinafter as clients), such as software application processes, running on a host processor communicate with the transport layer of the fabric by manipulating a transport service instance, known as a "queue pair" (QP), made up of a send work queue and a receive work queue. To send and receive messages over the network using a HCA, the client initiates work requests (WRs), which cause work items, called work queue elements (WQEs), to be placed in the appropriate work queues. Normally, each WR has a data buffer associated with it, to be used for holding the data that is to be sent or received in executing the WQE. The HCA executes the WQEs and thus communicates with a corresponding QP of the channel adapter of another host across the network. After it has finished servicing a WQE, the HCA typically writes a completion queue element (CQE) to a completion queue, to be read by the client as an indication that the work request has been executed.

IB channel adapters implement various service types and transport operations, including remote direct memory access (RDMA) read and write operations and SEND operations. Both RDMA write and SEND requests carry data sent by a channel adapter (known as the requester) and cause another channel adapter (the responder) to write the data to a memory address on its own network node. Whereas RDMA write requests specify the address in the remote responder's memory to which the data are to be written, SEND requests rely on the responder to determine the memory location at the request destination.

Upon receiving a SEND request addressed to a certain QP, the channel adapter at the destination node places the data sent by the requester into the next available receive buffer for that QP. To specify the receive buffers to be used for such incoming SEND requests, a client on the host computing device generates receive WQEs and places them in the receive queues of the appropriate QPs. Each time a valid SEND request is received, the destination channel adapter takes the next WQE from the receive queue of the destination QP and places the received data in the memory location specified in that WQE. Thus, every valid incoming SEND request engenders a receive queue operation by the responder.

The Internet Wide Area RDMA Protocol (iWARP) offers services and semantics for Internet Protocol (IP) networks that are similar to the IB features described above. Features of iWARP are specified by Shah et al., in "Direct Data Placement over Reliable Transports," published as Request for Comments (RFC) 5041 of the Internet Engineering Task Force (IETF). Implementation of iWARP over the Transmission Control Protocol (TCP) is described by Culley et al., in "Marker PDU Aligned Framing for TCP Specification," published as IETF RFC 5044. In the IP context, a TCP socket may be considered a transport service instance, roughly comparable to an IB QP.

U.S. Patent Application Publication 2003/0065856, whose disclosure is incorporated herein by reference, describes a method for communication between a network interface adapter and a host processor coupled thereto. The method includes writing information using the network interface adapter to a location in a memory accessible to the host processor. Responsively to having written the information, the network interface adapter places an event indication in an event queue accessible to the host processor. It then asserts an interrupt of the host processor that is associated with the event queue, so as to cause the host processor to read the event indication and, responsively thereto, to process the information written to the location.

In some embodiments disclosed in this publication, the network interface adapter asserts the interrupts to notify the host processor that it has written information to the host system memory, to be read and processed by the host. The information may comprise completion information, which the network interface adapter has written to one of a plurality of completion queues. The completion queues are mapped to different host event queues, wherein typically a number of completion queues may share the same event queue. In response to assertion of the interrupt by the network interface adapter, the host event handler reads the event and informs the appropriate application process that there is new information in its completion queue waiting to be read.

U.S. Pat. No. 7,746,854, whose disclosure is incorporated herein by reference, describes a fast flexible filter processor architecture for a network device. An incoming packet is received from a port and the incoming packet is inspected and packet fields are extracted. The incoming packet is classified based on the extracted packet fields and action instructions are generated. Further, the inspection and extraction include applying inspection mask windows to any portion of the incoming packet to extract programmable packet fields.

SUMMARY

In embodiments of the present invention that are described hereinbelow, a network interface controller prioritizes packets received from a network according to data in the packets.

There is therefore provided, in accordance with an embodiment of the present invention, a network interface controller, including a host interface, which is configured to be coupled to a host processor having a host memory. A network interface is configured to receive data packets from a network, each data packet including a header, which includes header fields, and a payload including data. Packet processing circuitry is configured to process one or more of the header fields and at least a part of the data, and to select, responsively at least to the one or more of the header fields, a location in the host memory. The circuitry is configured to write the data to the selected location, and upon determining that the processed data satisfies a predefined criterion, to assert an interrupt on the host processor so as to cause the host processor to read the data from the selected location in the host memory.

In some embodiments, the packet processing circuitry is configured to accept a definition of the criterion from a process running on the host processor in an unprotected user mode. The definition of the criterion may be stored in a transport context that is read and used by the packet processing circuitry in processing the received data packets that are associated with a specified transport service instance.

In a disclosed embodiment, the data that are processed by the circuitry with respect to satisfying the predefined criterion include unstructured data. Additionally or alternatively, the predefined criterion specifies a pattern of symbols, such that the processing circuitry asserts the interrupt when the processed data contains a match to the pattern.

In some embodiments, the packet processing circuitry is configured, when the processed data satisfies the predefined criterion, to write an event to an event queue in the host memory, wherein asserting the interrupt causes the host processor to read and service the event by reading the data from the selected location.

There is also provided, in accordance with an embodiment of the present invention, a network interface controller, including a host interface, which is configured to be coupled to a host processor having a host memory, which stores multiple queues containing queue elements for controlling interactions between the host processor and the network interface controller. A network interface is configured to receive data packets from a network, each data packet including a header, which includes header fields, and a payload including data. Packet processing circuitry is configured to process one or more of the header fields and at least a part of the data, to select, responsively at least to the one or more of the header fields, a location in the host memory, and to write the data to the selected location. The circuitry is configured to select a queue in the host memory depending on whether the processed data satisfies a predefined criterion, and to access an element in the selected queue so as to cause the host processor to read the data from the selected location in the host memory.

In some embodiments, the packet processing circuitry is configured, when the processed data satisfies the predefined criterion, to write an event to an event queue in the host memory and to assert an interrupt, which causes the host processor to read and service the event by reading the data from the selected location.

Additionally or alternatively, the packet processing circuitry is configured to write completion information to a plurality of completion queues in the host memory, and is configured, when the processed data satisfy the predefined criterion, to select a completion queue and to write the completion information to the selected completion queue. Typically, the data packets that are received from the network are associated with respective transport service instances, and the packet processing circuitry is configured to assign the received data packets to respective receive queues in the host memory responsively to the associated transport service instances, and to assign the data packet to a receive queue that is associated with the selected completion queue when the processed data satisfy the predefined criterion. Further additionally or alternatively, the processing circuitry is configured to assign the received data packets that are associated with a given transport service instance to a first receive queue when the processed data satisfy the predefined criterion, and to a different, second receive queue when the processed data do not satisfy the predefined criterion.

In some embodiments, the packet processing circuitry is configured to accept a definition of the criterion from a client process running on the host processor in an unprotected user mode. Typically, the queues have respective contexts that are read and used by the packet processing circuitry in processing the received data packets, wherein the contexts contain protection information that is written by a trusted process running on the host processor in a privileged mode, and wherein the packet processing circuitry is configured to carry out instructions submitted by the client process only after verifying that the instructions comply with the protection information.

There is additionally provided, in accordance with an embodiment of the present invention, a method for communication, which includes receiving data packets from a network in a network interface controller (NIC), which is coupled to a host processor having a host memory, each data packet including a header, which includes header fields, and a payload including data. One or more of the header fields and at least a part of the data in the NIC are processed so as to select, responsively at least to the one or more of the header fields, a location in the host memory. The data are written from the NIC to the selected location. Upon determining in the NIC that the processed data satisfies a predefined criterion, an interrupt is asserted on the host processor so as to cause the host processor to read the data from the selected location in the host memory.

There is further provided, in accordance with an embodiment of the present invention, a method for communication, which includes receiving data packets from a network in a network interface controller (NIC), which is coupled to a host processor having a host memory. Multiple queues containing queue elements for controlling interactions between the host processor and the network interface controller are maintained in the host memory. One or more of the header fields and at least a part of the data in the data packets are processed in the NIC so as to select, responsively at least to the one or more of the header fields, a location in the host memory. The data are written from the NIC to the selected location. A queue is selected in the host memory depending on whether the processed data satisfies a predefined criterion. An element in the selected queue is accessed so as to cause the host processor to read the data from the selected location in the host memory.

The present invention will be more fully understood from the following detailed description of the embodiments thereof, taken together with the drawings in which:

BRIEF DESCRIPTION OF THE DRAWINGS

FIG. 1 is a block diagram that schematically illustrates a computer system, in accordance with an embodiment of the present invention;

DETAILED DESCRIPTION OF EMBODIMENTS

Overview

Figure 2A:
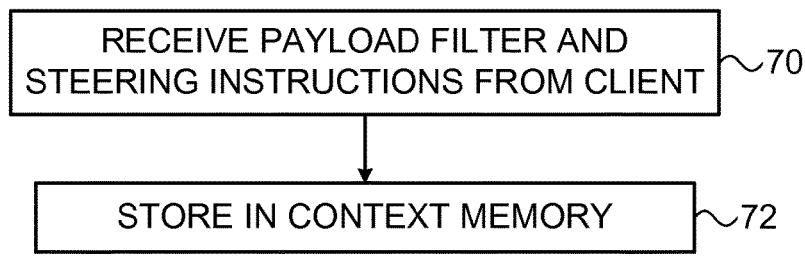
FIGS. 2A and 2B are flow charts that schematically illustrate a method for processing data packets received from a network, in accordance with an embodiment of the present invention.

Network interface controllers that are known in the art can be programmed to give higher priority (or equivalently, higher quality of service—QoS) to certain transport service instances and lower priority to others. For example, an InfiniBand HCA may be programmed to write CQEs for a high-priority QP to a completion queue that feeds a host event queue and generates interrupts to the host processor when a packet is received on this QP. On the other hand, CQEs for a low-priority QP may be written to another completion queue that receives lower-priority treatment, either by generating a lower-priority interrupt or, in some cases, waiting polling by the assigned host application without generating interrupts. In general, assignment of QPs to completion queues and binding of completion queues to host events and interrupts are protected operations, which can be performed only by trusted software with full kernel privileges. The HCA identifies the destination QP to which each incoming packet belongs based on the appropriate header fields and prioritizes the packet accordingly.

In embodiments of the present invention, a NIC prioritizes incoming messages based not only on the transport identifier (TCP socket or QP number) in the header, but on at least a part of the data in the packet payload. Thus, the receiving NIC may be programmed to assign different priorities to different incoming packets within a single transport service instance, according to the importance to the receiver (i.e., to the client program on the host that is to receive the data) of the data that they contain. In a disclosed embodiment, the NIC can receive this sort of prioritization instructions from an application process running on the host processor in an unprotected user mode.

For example, in program trading of securities, a computer typically receives data feeds from security exchanges quoting prices of shares or commodities, and must automatically make rapid buy and sell decisions. Speed of decision making can be of critical importance, and small time differences in execution of transactions can have a large impact on profitability. In this context, a broker or trading application program may determine at any given time—on the basis of local data processing—that a particular security (represented in the data feed by a particular symbol) is more important than others for purposes of current decision making. In response to this sort of determination, the application program may configure the NIC to check the payload of each incoming data packet in the transport service instance (or instances) that carry the data feed (or feeds) from the security exchange. When the NIC detects the symbol of interest in a given packet, it delivers the data to the host with higher priority than other packets, so that the trading application processes the data immediately. The NIC may, for example, cause a certain interrupt to be asserted on the host processor or may write a completion report (CQE) to a completion queue that is polled with high frequency.

This approach not only enhances the speed of decision-making, but also enables the decision on prioritization to be made immediately, locally and unilaterally, without any impact on the sender. Prioritization decisions of this sort can be made and changed at the user application (non-protected) level, in contrast to systems known in the art, in which assignment of event queues and interrupts is exclusively a privileged, administrator-level decision. In addition, this sort of data-based prioritization saves resources, in that only a single transport service instance need be used between the sender and receiver, and no management communications are required between the receiver and the sender when priorities change.

In some embodiments of the present invention that are described hereinbelow are implemented in a network interface controller (NIC), which comprises a host interface, coupled to a host processor, and a network interface, which receives data packets from a network. Packet processing circuitry in the NIC processes one or more of the header fields in each incoming packet in order to select the location in the host memory to which the payload data are to be written by the NIC. For at least some of the incoming packets, the NIC also processes at least a part of the payload data, in order to determine whether the data satisfy a predefined prioritization criterion, as explained above. When the criterion is satisfied, the NIC asserts an interrupt on the host processor, which causes the host processor to read the data from the location in the host memory to which the NIC has written the data.

In some embodiments, the prioritization is achieved by causing the processing circuitry in the NIC to select a queue in the host memory depending on whether the processed data satisfies a predefined criterion. The queue that is selected in this fashion may be an event queue, which is associated with an interrupt, as explained above. Alternatively or additionally, the processing circuitry may select a particularly completion queue or a receive queue (which may be associated with a desired completion queue) when the criterion is satisfied.

As noted earlier, the NIC may be configured to accept a definition of the prioritization criterion from a client process running on the host processor in an unprotected user mode. Typically, this definition applies to a particular transport service instance or possibly a number of instances (which are identified by the NIC based on the packet headers). The criterion is stored in the host memory in context of the transport service instance in question and is applied by the NIC to packets arriving on this transport service instance. The contexts of the queues that are used by the NIC in interacting with the host processor contain protection information that is written by a trusted process running on the host processor in a privileged mode. The packet processing circuitry in the NIC carries out the instructions submitted by the client process only after verifying that the instructions comply with the applicable protection information.

The criterion used by the NIC in prioritizing packets may apply to either structured or unstructured data that is contained in the packet payload. For instance, the criterion may specify a pattern of symbols (such as a string that represents a particular security in trade in the example described above), so that the processing circuitry asserts the interrupt to the host processor when the processed data contains a match to the pattern.

System Description

FIG. 1 is a block diagram that schematically illustrates a network communication system 20, in accordance with an embodiment of the present invention. A host computer 22 (also referred to as a host or a host device) communicates with other hosts 24, 26, 28 via a network 30, such as an IB switch fabric in the present example. Computer 22 comprises a central processing unit (CPU) 32 and a memory 34, which are connected by a suitable bus 36, as is known in the art. A NIC 38, such as an IB HCA, connects computer 22 to network 30.

NIC 38 comprises a network interface 42, which is coupled to network 30, and a host interface 40, which connects to CPU 32 and memory 34 via bus 36. Packet processing circuitry 44, coupled between network interface 42 and host interface 40, generates outgoing packets for transmission over network 30 and processes incoming packets received from the network, as described below. Interfaces 40 and 42 and circuitry 44 typically comprise dedicated hardware logic, whose details will be apparent to those skilled in the art after reading the present description. Alternatively or additionally, at least some of the functions of circuitry 44 may be implemented in software on a suitable programmable processor.

Client processes (referred to simply as clients 46) running on CPU 32, such as processes generated by application software, communicate with clients 48 running on remote hosts 24, 26, 28 by means of QPs on NIC 38. Each client 46 is typically assigned multiple QPs, which are used to communicate with different clients on various remote hosts. Context information regarding each QP is stored in a corresponding context 50. In the present embodiment, context 50 is stored in host memory 34; but context information may, additionally or alternatively, be stored in NIC 38 or in other dedicated memory. Each QP typically comprises a send queue (SQ) 52 and a receive queue (RQ) 54, as is known in the art. It is possible, however, to share receive queues among multiple QPs, and it is also possible to direct packets on the same QP to different receive queues depending on the payload data content, as described below.

Upon receiving a packet from network 30, processing circuitry 44 writes the packet payload data to an appropriate location in memory 34. The memory location may be indicated by a corresponding WQE in SQ 52 (when the packet contains a RDMA read response) or in RQ 54 (when the packet contains a SEND request) or by the packet header itself (when the packet contains a RDMA write request). After writing the payload data to memory 34, circuitry 44 writes a CQE to a completion queue (CQ) 56. The CQ number for each QP is recorded in QP context 50, and multiple QPs may share the same CQ.

Each CQ 56 is associated with an event queue (EQ) 58 of CPU 32, wherein multiple CQs may share the same EQ. Clients 46 may "arm" their assigned CQs by writing to the appropriate field in the CQ context. When processing circuitry 44 writes a CQE to an armed CQ, the circuitry then proceeds to write an event to the associated EQ and asserts an interrupt to the CPU. Typically, the CPU may have multiple interrupts, which may have different priorities; and multiple EQs may be tied to the same interrupt. CPU 32 comprises one or more cores, each comprising processing circuits and registers (not shown) and one or more interrupt inputs 60. Interrupts are typically asserted (or equivalently, "raised") by transmitting an interrupt message over bus 36 to the CPU, but other methods of interrupt signaling that are known in the art may alternatively be used. Asserting the interrupt causes the host processor to read and service the event in the appropriate EQ 58 by reading the data from the location in memory 34 that is indicated by the corresponding CQE. When a given CQ is not armed, processing circuitry 44 will not write events or generate interrupts upon writing to the CQ; rather, the CQ simply waits to be polled by clients 46.

As noted earlier, host computer 22, and particularly NIC 38, is configured to permit clients 46 to control certain functionality of NIC 38 by means of unprotected, user-mode operations. For example, clients 46 are able to define criteria that cause NIC 38 to assert interrupt 60 when the data contents of a given packet received from network 30 meet the criterion. The methods, data structures and protection mechanisms that can be used to implement this sort of functionality are described in detail hereinbelow.

Processing of Incoming Packets

FIG. 2A is a flow chart that schematically illustrates a method for defining steering criteria for incoming packets, in accordance with an embodiment of the present invention. "Steering" in this context means directing and prioritizing packets received from network 30 to the appropriate clients 46. This method enables clients 46, which may be non-privileged (non-protected), user-level applications, to set steering criteria to be applied by NIC 38 on the basis of packet content. As noted earlier, clients may freely change the steering criteria during run-time.

To apply a packet steering criterion for a given QP, client 46 defines a payload filtering criterion and corresponding steering instructions in a predefined format, at a steering definition step 70. The filtering criterion may have the generic form: "If data in a message arriving with transport content identifier XXX meets condition YYY, then perform action ZZZ." For example, the filtering criterion and instructions may state: "If the payload of an incoming SEND packet on QP #123 contains the string 'MLNX', assign the packet to RQ #456; else assign the packet to RQ #457." (In this example, RQ #456 may be associated with a CQ that is mapped to an EQ and generates interrupts, while RQ #457 is associated with another CQ that does not generate interrupt events.) As another example, the filtering criterion and instructions may have the form: "If the payload of an incoming RDMA packet on QP #123 contains the string 'BRCM', write a CQE upon completion to CQ #678; else write a CQE to RQ #679." Client 46 writes the filtering criterion and corresponding steering instructions to context 50 of the QP in question.

NIC 38 and associated driver software on CPU 32 ensure that the filtering and steering instructions programmed by client 46 do not exceed predefined client privileges. For example, the driver will typically allow the client to write such instructions only for QPs that have been pre-assigned to the client. Furthermore, the NIC may restrict generation of events, so that a given client cannot cause more than a certain maximum number of interrupts within a given time span, even if the filtering criterion is satisfied more often.

The filtering criteria may be expressed in any suitable form that is known in the art. In addition to the sort of unstructured text matching shown in the above examples, regular expressions and other sorts of more complex pattern matching and logical criteria may be defined. As another option, client 46 may give instructions to NIC 38 to filter higher-level protocol information, such as application-layer headers, as well as other structured data, that are contained in the payloads of incoming packets.

Figure 2B:
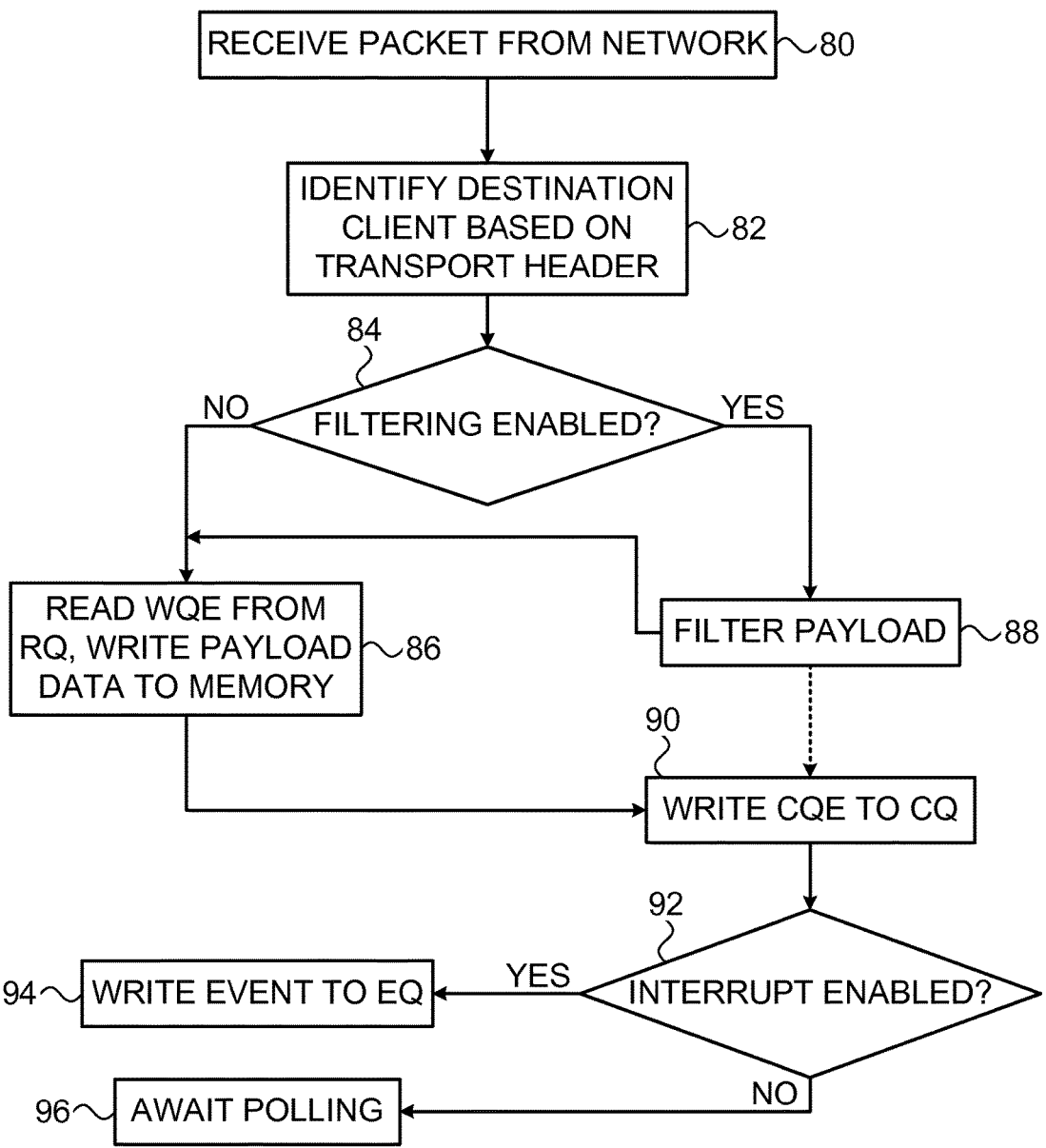

FIG. 2B is a flow chart that schematically illustrates a method for processing data packets received from network 30, in accordance with an embodiment of the present invention. This method assumes that a client 46 has programmed steering instructions in QP context 50. The flow chart refers, for the sake of simplicity and clarity, to processing of incoming SEND packets, but the principles of the method may similarly be applied, mutatis mutandis, to packets of other types, such as RDMA write requests and read responses.

The method is initiated when NIC 38 receives a packet from network 30, at a packet input step 30. Processing circuitry 44 reads the transport header of the packet in order to identify the destination QP, and thus to identify the client 46 to which the packet payload is to be steered, at a transport processing step 82. Circuitry 44 reads information from context 50 in order to determine whether the client has recorded filtering and steering criteria for the QP, at a filter checking step 84. If not, circuitry 44 simply reads a WQE from the appropriate RQ 54 for this QP, and then writes the packet payload data to the location in memory 34 that is indicated by the WQE, at a data writing step 86.

On the other hand, if filtering is enabled for the QP identified at step 82, processing circuitry 44 reads the applicable filtering criterion from context 50 and uses it to filter the payload data of the incoming packet, at a filtering step 88. If the data satisfy the filtering criterion (for example, if a specified string is found), processing circuitry 44 applies the corresponding steering instructions. For example, for incoming SEND packets, the circuitry may choose one RQ when the criterion is satisfied and another RQ when it is not. The circuitry then proceeds to read a WQE from the selected RQ and to write the payload data to the location in memory 34 that is indicated by the WQE at step 86.

After writing the payload data to memory, processing circuitry 44 writes a CQE to the CQ 56 that corresponds to the selected RQ, at a completion writing step 90. Different choices of RQs at step 88 (due to packets with payload data that satisfy or do not satisfy the filtering criterion) can thus result in CQEs being written to different completion queues, even for packets having the same destination QP. In other words, CQEs will be written to one CQ when the data satisfy the filtering criterion and to another CQ when they do not. It is also possible in this manner to direct CQEs for a single destination QP to three or more different CQs.

Alternatively or additionally, CQEs for a given destination QP may be written to different CQs even without using different RQs to receive the packets. Rather than choosing a RQ at step 88, processing circuitry 44 may choose the CQ directly based on the payload data. In other words, if filtering is found to be enabled at step 84, circuitry 44 will choose a given CQ for packets that satisfy the filtering criterion and a different CQ for packets that do not. The approach can be used not only for steering incoming SEND packets, but also for incoming RDMA write requests and read responses.

Regardless of how CQ 56 was chosen at step 90, processing circuitry 44 checks whether interrupts are enabled for this CQ, at an interrupt checking step 90. If not, processing of this packet by NIC 38 is finished, and the CQE written at step 90 simply awaits polling by CPU 32, at a polling step 96. If interrupts are enabled for the CQ, NIC 38 writes an event to the corresponding EQ 58, and asserts the corresponding interrupt to CPU 32, at an event generation step 94. The CPU will service the interrupt, and the appropriate client 46 will thus be alerted to read and process the packet data immediately.

In alternative embodiments, handling of incoming packets may be prioritized by assigning the packets to completion queues and/or receive queues without necessarily triggering interrupts. For example, rather than choosing a CQ at step 90 that generates interrupts when packets with high-priority payloads are received, circuitry 44 may be directed to write CQEs to a CQ that is regularly polled by CPU 32. Continual polling of a given CQ may actually enable the corresponding client 46 to respond more rapidly than interrupt-driven response. As another example, choice of an appropriate RQ at step 86 for packets with high-priority payloads may facilitate speedier handling of these packets due to efficient cache management, even when the completion queues and event queues are not differentiated.

Implementation of User-Mode Packet Steering Control

As noted earlier, in network interface controllers that are known in the art (as well as in other types of input/output devices), interrupt generation and assignment of other system resources are generally protected operations, which are under the control of privileged software entities at the level of the operating system. In embodiments of the present invention, however, user-level applications are allowed to access and manipulate interrupts and queue assignments. The following section describes the data structures that are used in host computer 22 to enable this sort of user-level access to system resources and explains how NIC 38 and software on CPU 32 control these data structures and resources to ensure that system integrity is maintained even in the face of user-level software bugs and malware.

As noted above, NIC 38 maintains a number of different types of data objects that can be assigned to and used by client applications 46:
  Queue pairs (QPs), each comprising a SQ 52 and a RQ 54 for executing input/output (I/O) operations;
  Completion Queues (CQs) 56 used to report completion of I/O operations; and
  Event Queues (EQs) 58 used to report events associated with I/O operations.
Other data objects used by NIC 38 include interrupt (INT) objects, typically in the form of interrupt messages on bus 36, for generating interrupts 60 on CPU 32, and memory regions (MKeys) in memory 34, with associated virtual address ranges, for memory reference during I/O operations.

Each of the above objects has its respective context 50, which is initially configured by a privileged entity (such as the operating system or a virtual machine hypervisor running on CPU 32). The QP, CQ, EQ and INT objects have respective many-to-one associations (from left to right). In other words, multiple QPs may feed a single CQ; multiple CPs may feed a single EQ; and multiple EQs may drive a single INT. This association is configured in respective object contexts 50 by a privileged entity, and this static association is maintained throughout operation of NIC 38.

Based on these static associations, NIC 38 references locations in memory 34 during read and write operations executed on a particular QP using data couples of the form {MKey, virtual_address}. This couple creates a runtime association between a memory region (specified by MKey) and the QP. To support these runtime associations, in an embodiment of the present invention, the context of each QP contains protection information in the form of the following objects:
  Memory buffer where WQEs (send and receive) can be posted by untrusted QP client 46;
  User Access Region (UAR)—a memory window, typically defined in terms of CPU pages, that is used to notify NIC 38 that WQEs for this QP are posted in the respective memory buffer (referred to as "ringing a doorbell"), so that the NIC can start executing the associated I/O operation;
  List of I/O operations this QP is eligible to execute;
  Protection Domain (PD), which defines the memory range accessible to the QP—used to validate access rights for runtime associations;

CQ with which this QP is associated; and

QoS parameters, defining the amount of hardware resources this QP can consume for operations.

Similarly, each CQ and EQ context contains its own UAR, which is used to arm the CQ or the EQ, and a respective memory buffer to which NIC 38 writes CQEs or event reports (known as event queue elements—EQEs). In addition, each CQ context indicates the EQ with which the CQ is associated, while the EQ context indicates the INT with which the EQ is associated.

The context of each MKey identifies the virtual address range that can be accessed with this MKey and contains a corresponding address translation table, for translating the virtual addresses to physical addresses. The MKey context also indicates the access rights that can be granted to the memory region (local/remote, read/write/atomic, etc.) and the Protection Domain (PD) that is used to validate access rights for explicit associations made by clients 46 between data transfer requests and locations in memory 34.

Figure 3:
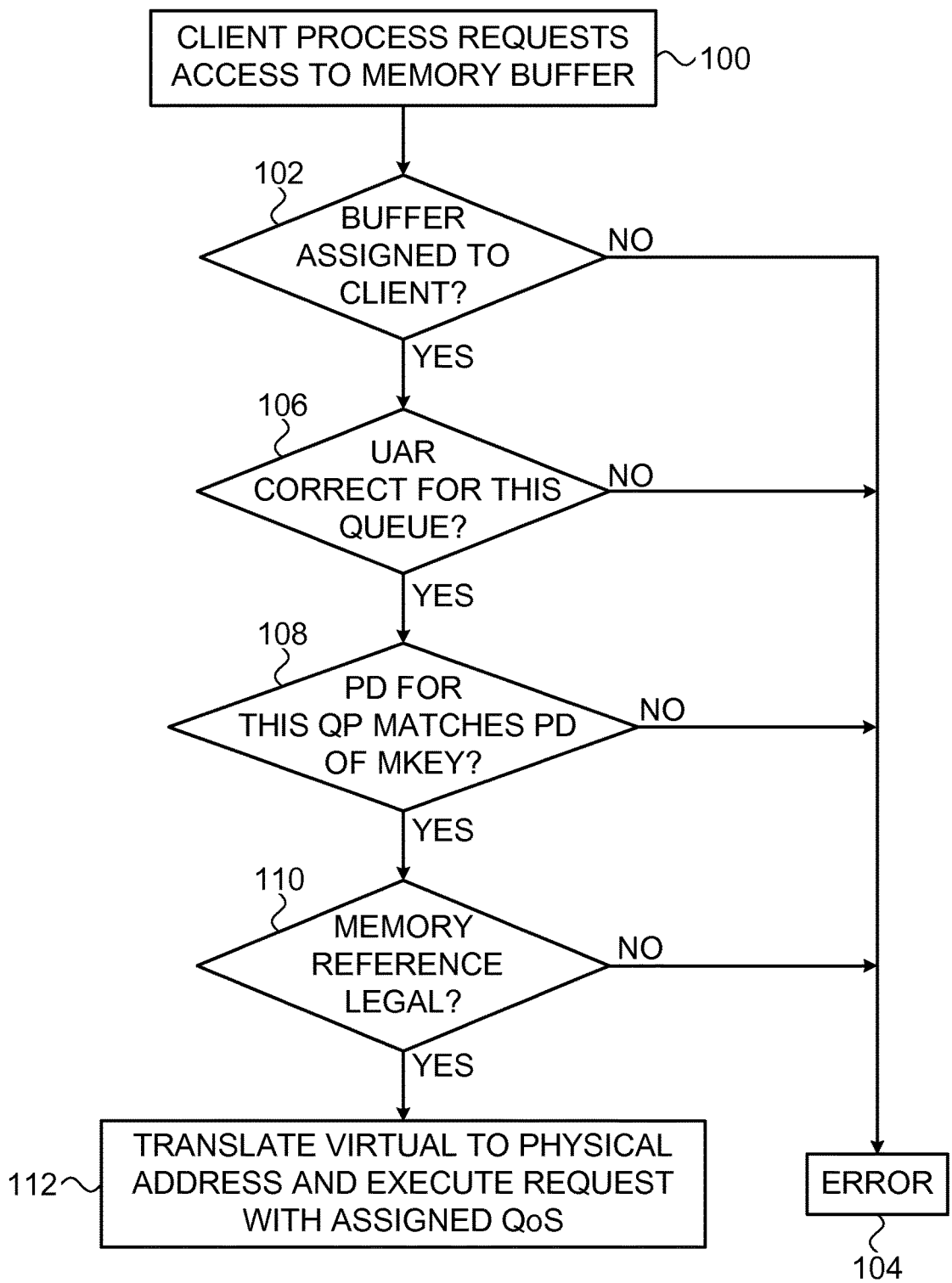
FIG. 3 is a flow chart that schematically illustrates a method for controlling access by clients to host resources, in accordance with an embodiment of the present invention.

FIG. 3 is a flow chart that schematically illustrates a method applied by host computer 22, and particularly by NIC 38, in controlling access by clients 46 to host resources, in accordance with an embodiment of the present invention. This method, using the protection information in contexts 50, is applied, inter alia, in enabling the clients to safely control the prioritization and QoS to be applied by NIC 38 to incoming packets, including generation of interrupts to CPU 32, as explained above. It ensures that packet processing circuitry 44 will carry out instructions submitted by the client process only after verifying that the instructions comply with the protection information. The method is not limited to the specific issues of prioritization and QoS, however, and may similarly be applied in controlling access by non-trusted clients to other computer resources.

The method of FIG. 3 is initiated when a client 46 submits a request to access a host resource, such as a buffer in memory 34, at a client request step 100. The request may apply, for example, to WQE, CQE and EQE buffers, as well as UARs. A memory manager program running on or associated with CPU 32 verifies that the requested buffer is, in fact, assigned to the requesting client, at a memory management step 102. If not, the request is rejected, and the memory manager returns an error response to the client, at an error step 104.

Assuming the client request is approved by the memory manager at step 102, the memory manager passes the request to NIC 38. Processing circuitry 44 in the NIC performs a number of stages of validation before carrying out the request. The processing circuitry checks the UAR of the client request against the UAR that is assigned to the QP, CQ or EQ in question in context 50, at a UAR checking step 106. Circuitry 44 also protects against improper memory access by verifying that the PD of the QP that is invoked by client 46 to execute any operation on data in memory 34 matches the PD in the context of the corresponding MKey, at a memory domain checking step 108. Finally, circuitry 44 validates that the memory reference made by client 46 is itself legal (i.e., a permitted operation, within the allowed address range) by checking the address range and access rights in the MKey context, at a reference checking step 110. If any of these checks fail, NIC 38 returns an error response to the client at step 104.

When a client request has passed all the above protection steps successfully, processing circuitry 44 uses the address translation table in the MKey context to translate the virtual address specified by client 46 to the corresponding physical address in memory 34, at a memory translation step 112. NIC 38 then proceeds to execute the client request using the physical address thus obtained. This operation is performed at the QoS (priority) level that has been pre-assigned to the QP, CQ or EQ in question. Thus, user-level clients 46 are able to choose—and vary—the QoS with which NIC 38 treats their incoming packets, by choosing among options that have been pre-configured on NIC 38 by trusted entities. The method and data structures described above ensure that the client choices will not interfere with other clients or harm the operation of host computer 22, whether by error or malicious intent.

Although for the sake of clarity, the embodiments described above use vocabulary that is associated with the InfiniBand architecture, the principles of these embodiments may similarly be applied, mutatis mutandis, to NICs that operate in accordance with other standards that are known in the art, such as TCP/IP. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface controller, comprising:
    a host interface, which is configured to be coupled to a host computer having a host memory and a central processing unit which runs user level or client applications;
    a network interface, which is configured to receive data packets from a network, each data packet having a header comprising header fields and a payload comprising data; and
    packet processing circuitry, which is configured in dedicated hardware logic to write data packets received by the network interface to respective locations in the host memory selected responsively to one or more header fields of the data packets received by the network interface, to select a priority for a data packet which is one of the received data packets, responsively to at least a part of the application layer data in the payload of the data packet, and to report to the host computer that the data packet was written to the host memory, wherein the reporting is performed in a manner selected responsively to the selected priority.

2. The network interface controller according to claim 1, wherein the packet processing circuitry is configured to select the priority for the data packet, responsively to whether at least a part of the data in the payload of the packet satisfies a predefined criterion.

3. The network interface controller according to claim 2, wherein the packet processing circuitry is configured to accept a definition of the predefined criterion from a process running on the host computer in an unprotected user mode.

4. The network interface controller according to claim 3, wherein the definition of the predefined criterion is stored in a transport context that is read and used by the packet processing circuitry in processing the received data packets that are associated with a specified transport service instance.

5. The network interface controller according to claim 2, wherein the predefined criterion specifies a pattern of symbols, and the processing circuitry is configured to select the priority for the data packet, responsively to whether the data in the payload contains a match to the pattern.

6. The network interface controller according to claim 1, wherein the packet processing circuitry is configured to select for a packet of a specific traffic identifier, a handling option for the packet from a plurality of different handling options defined for packets of the specific traffic identifier, responsively to at least a part of the data in the payload of the packet.

7. The network interface controller according to claim 1, wherein the packet processing circuitry is configured to initiate an interrupt for packets having a high priority and not initiate an interrupt for packets having a low priority.

8. The network interface controller according to claim 1, wherein the packet processing circuitry is configured to initiate different interrupts for packets of different priorities.

9. The network interface controller according to claim 1, wherein the payload data used by the packet processing circuitry in selecting the manner to report to the host computer that the packet was written to the host memory comprises an application-layer header.

10. The network interface controller according to claim 1, wherein the packet processing circuitry is configured to select a queue for the packet responsively to both the priority of the packet and one or more fields of the header of the packet.

11. The network interface controller according to claim 1, wherein the payload data that are used in selecting the priority comprise unstructured data.

12. A network interface controller, comprising:
a host interface, which is configured to be coupled to a host computer having a host memory, which stores multiple queues containing queue elements for controlling interactions between the host computer and the network interface controller, and a central processing unit which runs user level or client applications, wherein the host computer accesses elements in completion queues in the host memory and accordingly handles packets written by the network interface controller to the host memory;
a network interface, which is configured to receive data packets from a network, each data packet having a header comprising header fields and a payload comprising data; and
packet processing circuitry, which is configured to identify for a data packet received by the network interface, a destination queue pair (QP) of the packet, responsively to one or more fields of the header of the packet, to write the packet to a location in the host memory through the host interface, and to select a completion queue, different from the destination QP, for the data packet from a plurality of completion queues available for the destination QP identified for the packet, responsively to at least a part of the data in the payload of the packet.

13. The network interface controller according to claim 12, wherein the payload data that are used in selecting the completion queue comprise unstructured data.

14. The network interface controller according to claim 12, wherein the packet processing circuitry is configured, when the payload data satisfy a predefined criterion, to write an event to an event queue in the host memory and to assert an interrupt, which causes the host computer to read and service the event by reading the data from the selected location.

15. The network interface controller according to claim 12, wherein the packet processing circuitry is configured to write completion information of a single QP to a plurality of completion queues in the host memory, and is configured, when the payload data satisfy a predefined criterion, to write the completion information to a different completion queue than written to when the predefined criterion is not satisfied.

16. The network interface controller according to claim 15, wherein the data packets that are received from the network are associated with respective transport service instances, and wherein the packet processing circuitry is configured to assign the received data packets to respective receive queues in the host memory responsively to the associated transport service instances, and to assign the data packet to a receive queue that is associated with the selected completion queue when the payload data satisfy the predefined criterion.

17. The network interface controller according to claim 12, wherein the data packets that are received from the network are associated with respective transport service instances, and wherein the processing circuitry is configured to assign the received data packets that are associated with a given transport service instance to a first receive queue when the payload data satisfy a predefined criterion, and to a different, second receive queue when the payload data do not satisfy the predefined criterion.

18. The network interface controller according to claim 12, wherein the packet processing circuitry is configured to accept a definition of a criterion for selecting the completion queue from a client process running on the host computer in an unprotected user mode.

19. The network interface controller according to claim 18, wherein the multiple queues in the host memory have respective contexts that are read and used by the packet processing circuitry in processing the received data packets, wherein the contexts contain protection information that is written by a trusted process running on the host computer in a privileged mode, and wherein the packet processing circuitry is configured to carry out instructions submitted by the client process only after verifying that the instructions comply with the protection information.

20. The network interface controller of claim 12, wherein the packet processing circuitry is configured to select completion queues for received packets, by determining a priority for the received packet based on at least a part of the data in the packet payload and selecting the completion queue responsive to the determined priority.

21. The network interface controller of claim 20, wherein the packet processing circuitry is configured to manage for packets of a specific traffic identifier a plurality of receive queues from which the receive queue is selected responsively to the determined priority of the packet, for each specific packet of the traffic identifier.

22. The network interface controller of claim 12, wherein the packet processing circuitry is configured to determine whether the payload of the packet meets a specific criterion and upon determining that the processed data satisfies the specific criterion, to assert an interrupt on the host computer to expedite handling of the packet.

23. The network interface controller of claim 22, wherein the packet processing circuitry is configured to select for packets meeting the specific criterion a specific interrupt for the packet, from a plurality of interrupts of different priorities.

24. The network interface controller of claim 12, wherein the packet processing circuitry is configured to select a completion queue for a received packet based on determination of whether the payload of the packet includes a specific symbol sequence.

25. The network interface controller of claim 12, wherein the packet processing circuitry is further configured to select an event queue, responsively to at least a part of the payload of the packet.

26. The network interface controller according to claim 12, wherein the packet processing circuitry is configured to select a completion queue for a data packet from a plurality of completion queues, by selecting a receive queue from a plurality of receive queues associated with respective completion queues.

27. A method for communication, comprising:
receiving a data packet from a network in a network interface controller (NIC), which is coupled to a host computer having a host memory and a central processing unit which runs user level or client applications, the data packet comprising a header comprising header fields and a payload comprising data;
processing one or more of the header fields of the received data packet, by dedicated hardware logic in the NIC, so as to select, responsively to one or more fields of the header of the received data packet, a location in the host memory for the received data packet;
writing the data in the payload of the received data packet from the NIC to the selected location in the host memory;
selecting in the NIC a priority for the received data packet, responsively to at least a part of the application layer data in the payload of the received data packet; and
reporting to the host computer that the received data packet was written to the host memory, wherein the reporting is performed in a manner selected responsively to the selected priority.

28. The method according to claim 27, wherein selecting the priority for the data packet comprises selecting the priority responsively to determining whether at least a part of the data in the payload of the packet satisfies a predefined criterion.

29. The method according to claim 28, wherein the reporting comprises writing an event to a specific event queue in the host memory when the predefined criterion is met.

30. The method according to claim 28, comprising accepting a definition of the predefined criterion from a process running on the host computer in an unprotected user mode.

31. The method according to claim 30, wherein accepting the definition of the predefined criterion comprises storing the definition in a transport context that is read and used by the NIC in processing the received data packets that are associated with a specified transport service instance.

32. The method according to claim 28, wherein determining whether at least a part of the data in the payload of the packet satisfies the predefined criterion comprises applying the predefined criterion to unstructured data in the payload.

33. The method according to claim 32, wherein the predefined criterion specifies a pattern of symbols, and wherein determining whether at least a part of the data in the payload of the packet satisfies the predefined criterion comprises determining whether the payload data contains a match to the pattern.

34. The method according to claim 28, wherein determining whether at least a part of the data in the payload of the packet satisfies a predefined criterion comprises reading the criterion from a context associated with a destination queue pair (QP) of the packet.

35. A method for communication, comprising:
receiving data packets from a network in a network interface controller (NIC), which is coupled to a host computer having a host memory and a central processing unit which runs user level or client applications, each data packet comprising a header comprising header fields and a payload comprising data;
maintaining in the host memory multiple queues containing queue elements for controlling interactions between the host computer and the network interface controller;
processing one or more of the header fields of one of the received packets in the NIC, to select, responsively at least to one or more fields of the header of the packet, a location in the host memory and a destination queue pair (QP) of the packet;
writing the data of the packet from the NIC to the selected location;
selecting, by the NIC, a completion queue in the host memory depending both on one or more of the header fields of the packet and on whether at least a part of the content of the data in the payload of the data packet satisfies a predefined criterion, wherein the completion queue is different from the destination QP; and
accessing an element in the selected completion queue so as to cause the received packet to be handled in accordance with a handling associated with the selected completion queue.

36. The method according to claim 35, wherein accessing the element comprises writing an event to an event queue in the host memory when the payload data satisfies the predefined criterion, so as to cause the host computer to read and service the event by reading the data from the selected location.

37. The method according to claim 35, wherein the NIC is configured to write completion information to a plurality of completion queues in the host memory, and wherein accessing the element comprises, when the payload data satisfy the predefined criterion, selecting a completion queue and writing the completion information to the selected completion queue.

38. The method according to claim 37, wherein the data packets that are received from the network are associated with respective transport service instances, and wherein selecting the completion queue comprises assigning the received data packets to respective receive queues in the host memory responsively to the associated transport service instances, and assigning the data packet to a receive queue that is associated with the selected completion queue when the payload data satisfies the predefined criterion.

39. The method according to claim 35, wherein the data packets that are received from the network are associated with respective transport service instances, and wherein selecting the completion queue comprises directing the received data packets that are associated with a given transport service instance to a first receive queue when the payload data satisfy the predefined criterion, and to a different, second receive queue when the payload data do not satisfy the predefined criterion.

40. The method according to claim 35, wherein selecting the completion queue comprises accepting a definition of the criterion from a client process running on the host computer in an unprotected user mode.

41. The method according to claim 40, wherein the multiple queues in the host memory have respective contexts that are read and used by the packet processing circuitry in processing the received data packets, wherein the contexts contain protection information that is written by a trusted process running on the host computer in a privileged mode, and wherein accessing the element comprises carrying out instructions submitted by the client process only after verifying that the instructions comply with the protection information.

* * * * *